(12) United States Patent
Wray et al.

(10) Patent No.: US 7,194,654 B2
(45) Date of Patent: Mar. 20, 2007

(54) COMMUNICATIONS SYSTEM FOR AND METHOD OF RECOVERING FROM COMMUNICATIONS FAILURE

(75) Inventors: Stuart C Wray, Broadstone (GB); John A Allen, Kenilworth (GB)

(73) Assignee: Ericsson AB, Stockholm (SE)

( * ) Notice: Subject to any disclaimer, the term of this patent is extended or adjusted under 35 U.S.C. 154(b) by 503 days.

(21) Appl. No.: 10/312,304

(22) PCT Filed: Jul. 2, 2001

(86) PCT No.: PCT/GB01/02957

§ 371 (c)(1),
(2), (4) Date: Apr. 10, 2003

(87) PCT Pub. No.: WO02/05488

PCT Pub. Date: Jan. 17, 2002

(65) Prior Publication Data

US 2003/0154420 A1      Aug. 14, 2003

(30) Foreign Application Priority Data

Jul. 4, 2000      (GB)      ................................ 0016289.1

(51) Int. Cl.
*G06F 11/00*      (2006.01)

(52) U.S. Cl. ..................... 714/4; 370/216; 370/217; 370/218

(58) Field of Classification Search ..................... None
See application file for complete search history.

(56) References Cited

U.S. PATENT DOCUMENTS

| | | | | |
|---|---|---|---|---|
| 5,528,513 A | * | 6/1996 | Vaitzblit et al. | ............. 718/103 |
| 5,548,710 A | * | 8/1996 | Oono et al. | ..................... 714/2 |
| 5,581,689 A | | 12/1996 | Slominski et al. | |
| 5,719,854 A | * | 2/1998 | Choudhury et al. | ........ 370/231 |
| 5,737,747 A | * | 4/1998 | Vishlitzky et al. | .......... 711/118 |
| 5,848,128 A | * | 12/1998 | Frey | .............................. 379/9 |
| 6,079,028 A | * | 6/2000 | Ozden et al. | ................... 714/6 |
| 6,111,852 A | * | 8/2000 | Leung et al. | ............... 370/217 |
| 6,674,713 B1 | * | 1/2004 | Berg et al. | .................. 370/217 |
| 6,693,874 B1 | * | 2/2004 | Shaffer et al. | .............. 370/217 |
| 6,738,343 B1 | * | 5/2004 | Shaffer et al. | .............. 370/216 |

(Continued)

FOREIGN PATENT DOCUMENTS

| | | |
|---|---|---|
| GB | 2 317 308 A | 3/1998 |
| WO | WO 98/35471 | 8/1998 |

OTHER PUBLICATIONS

*Media Gateway Control Protocol and Voice Over IP Gateways, MGCP and VOIP Gateways Will Offer Seamless Interworking of New VVOIP Networks With Today's Telephone Networks*, Electrical Communication, L. P. Anquetil, et al., Alcatel, Brussels, BE, Apr. 1, 1999, pp. 151-157.
The Mainstreetxpress 36190: A Scalable and Highly Reliable ATM Core Services Switch, Erwin P. Rathgeb, Computer Networks 31 (1999) pp. 583-601.

*Primary Examiner*—Robert Beausoliel
*Assistant Examiner*—Philip Guyton
(74) *Attorney, Agent, or Firm*—Kirschstein, et al.

(57) ABSTRACT

A communications system has a plurality of islands, and a media path having resources for carrying data in a plurality of calls between first and second ones of the islands. Each of the first and second islands has a controller for managing allocation of the resources of the media path between the plurality of calls. A faulty controller is detected, and either replaced with a working replacement controller or recovered to working order. A further controller provides to the replacement or recovered controller, on replacement or recovery, information on the allocation of the resources of the media path.

24 Claims, 1 Drawing Sheet

IP Telephony Network Architecture

U.S. PATENT DOCUMENTS 6,785,223 B1 *  8/2004  Korpi et al. ................ 370/218

6,842,780 B1 *  1/2005  Frei et al. ................... 709/221

* cited by examiner

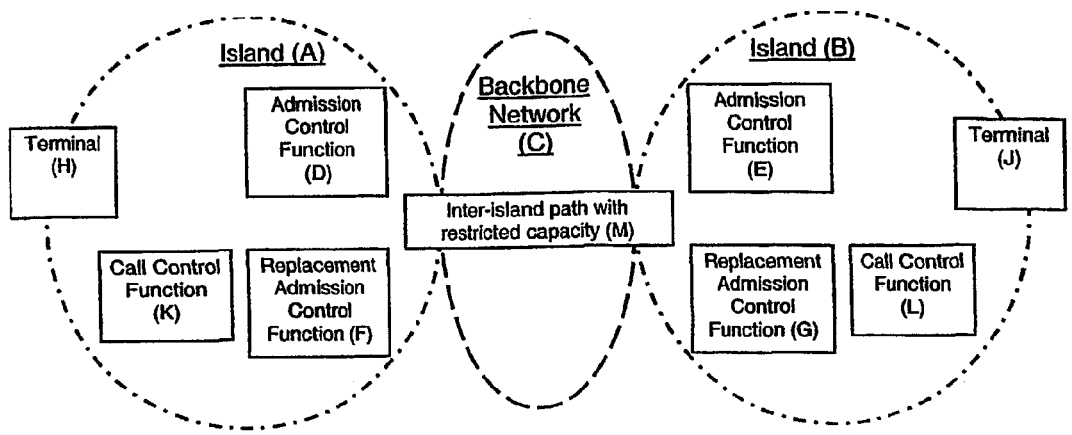
Figure 1 - IP Telephony Network Architecture
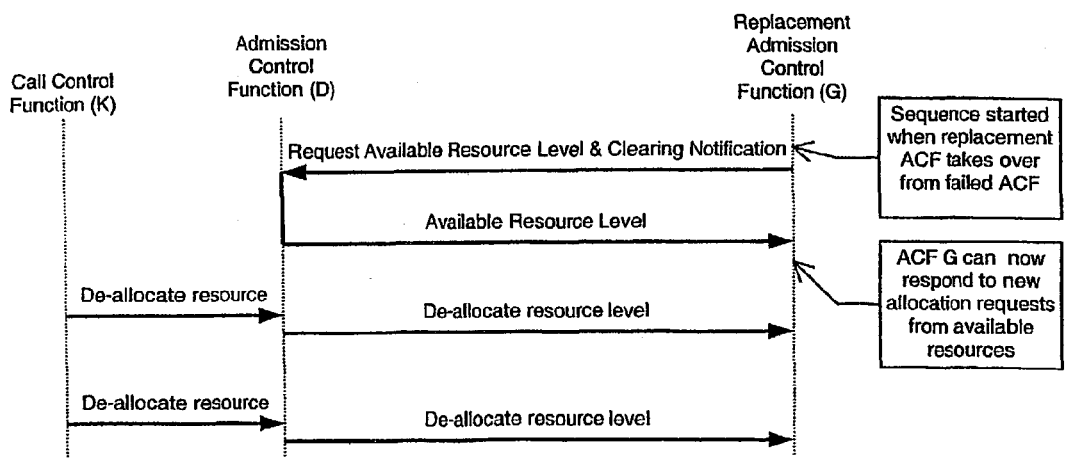
Figure 2 – Example message sequence

COMMUNICATIONS SYSTEM FOR AND METHOD OF RECOVERING FROM COMMUNICATIONS FAILURE

The present invention is directed to the field of communications in general and to a method of recovering from a failure in a communications system in particular.

Multimedia communications services over Packet Based Networks (PBN) which may not provide a guaranteed Quality of Service are described in ITU-T Recommendation H.323 (February 1998). The packet based network over which H.323 entities communicate may be point-to-point connections, a single network segment, or an internetwork having multiple segments and possibly complex topologies. ITU-T Recommendation E.164 (May 1997) describes the international public telecommunication numbering plan.

A typical IP telephony system comprises a plurality of hosts interconnected via a backbone network composed of a number of routers to which the plurality of hosts are connected. These hosts are grouped in network "islands" which have high bandwidth available between all hosts in an island. These islands of high bandwidth are interconnected by the "backbone" network comprising a number of links of known but limited bandwidth between pairs of islands. The bandwidth available on a link between two islands will not generally be sufficient to carry all the telephony traffic between those islands which the hosts in the islands could, in theory, generate. Associated with each inter-island link there are therefore a pair of hosts, one at each end of the inter-island link, which perform an Admission Control Function (ACF). When a host in an island wants to use bandwidth on an inter-island link, it must first be granted permission by the local host performing the ACF for that inter-island link. The ACF ensures that the link bandwidth is never over-committed. If the bandwidth would be over-committed by granting permission for more bandwidth use, then permission is denied. In H.323 based networks, the admission control function is contained within the H.323 gatekeeper. The guaranteed Quality Of Service required for correct transmission of telephony traffic through restricted-bandwidth inter-island links thus depends on correct operation of the ACF. To correctly control traffic on the backbone network links, the ACF at both ends of an inter-node link must hold the same information about link usage. In normal operation, this is achieved by synchronisation of the two ACFs achieved by way of inter-host signalling.

If the ACF in a host at one end of a link fails, the media (traffic) carried by that link will continue to flow (i.e. existing calls will continue). The island would normally be provided with a spare ACF that can be brought into service to replace the failed one. This new ACF will assume the role of the failed one, taking over control of its inter-island links. The replacement ACF will have no knowledge of the link resource allocations in effect immediately before the failure of its predecessor. Although it will gradually obtain knowledge of the true allocation state through updates from inter-island signalling generated when existing allocations are released, it is not in a position on coming into service to immediately authorise new allocation requests. The time to recover is directly related to the duration of resource allocations handled by the ACF. In an IP telephony network the allocations of inter-island resources are associated with calls. The ACF will not fully regain control of the inter-island link until all calls in progress at the time of failure have cleared. Due to the potentially long call hold time, the ACF will not be fully in control for an unacceptably long time following failure.

The present invention provides a communications system comprising a plurality of islands, a media path comprising resources for carrying data in a plurality of calls between first and second ones of the islands in which each of the first and second islands comprises control means for managing allocation of the resources of the media path between the plurality of calls; in which the system also comprises means for detecting a faulty control means and either replacing the faulty control means with a working replacement control means or recovering the faulty control means to working order; in which the system also comprises means for providing to the replacement or recovered control means on replacement or recovery information on the allocation of the resources of the media path.

The present invention further provides a method of managing communications in a communications system comprising a plurality of islands and a media path comprising resources for carrying data in a plurality of calls between first and second ones of the islands in which each of the first and second islands comprises control means for managing allocation of the resources of the media path between the plurality of calls; the method comprising the steps of detecting a faulty control means and either replacing the faulty control means with a working replacement control means or recovering the faulty control means to working order; providing to the replacement or recovered control means on replacement or recovery information on the allocation of the resources of the media path.

Embodiments of the present invention will now be described by way of example with reference to the drawings in which:

FIG. 1 shows in diagrammatic form an IP telephony system of the prior art;

FIG. 2 shows a representation of a message sequence according to the present invention.

FIG. 1 shows an IP communications network comprising a plurality of islands A, B, interconnected via backbone network C comprising links (not shown) of limited capacity. Calls between the islands are controlled by a call control function (CCF) K,L in each island. Allocation of link resources to multiple calls between the islands is controlled by an ACF D,E within each island. Each island also contains a replacement ACF F,G that will take over in the event of failure of the original ACF. Island A also comprises one or more IP telephony terminals represented by terminal H and island B also comprises one or more IP telephony terminals represented by terminal J.

The sequence of events followed in setting up and clearing down a successful call from IP telephony terminal H to IP telephony terminal J will now be described with reference to FIG. 2, as follows:

1. The calling terminal H contacts local call control function K, and supplies an identifier (for example an E.164 number) for the terminal it wishes to call (e.g. terminal J);
2. CCF K determines that the called terminal J is in another island B, and that the appropriate path M for media to pass between the two islands is via backbone network C;
3. CCF K contacts the ACF D associated with the local end of inter-island path M to request allocation of resources within path M to handle the call;
4. ACF D confirms that the required resources are available, and records the resources (e.g. bandwidth on path M) allocated for the call. If insufficient resources are available, the call attempt is rejected;

5. If sufficient resources are available, CCF K contacts its peer CCF L in island B to extend the call toward its destination. CCF L then contacts its local ACF E associated with the local end of the inter-island path M to request allocation of resources within path M to handle the call. Thus the ACFs at both ends of the link have to allocate the same resources on the link needed to send the call over backbone network C;

6. ACF E confirms that the required resources are available, and records the resources allocated for the call. However, if insufficient resources are available, the call attempt is rejected by ACF E. This could occur if calls are set up simultaneously in both directions. In this case both ACFs D and E will grant a requesting call permission to leave their own island, based on the known bandwidth available, and independently make a local note that this bandwidth has now been committed. However one or both (this depends on exact timing and bandwidth requested) of the calls could then be rejected by the ACF receiving the call at the other end if the receiving ACF has in the mean time committed bandwidth to the simultaneous outgoing call going in the other direction and, as a result, doesn't have enough bandwidth remaining;

7. If sufficient resources are available, call CCF L contacts the destination terminal J to extend the call to its destination and complete setup of the call. Data may now flow between the terminals H, J using the resources that have just been allocated in path M.

At the end of the call one or other of the terminals H, J inform their local call control function K,L respectively) that they wish to terminate the call. The local CCF in turn contacts the local ACF, D or E, to free the resources allocated in path M for that call. Termination of the call in islands A, B may be synchronised by communication between the two CCFs K, L.

If ACF E fails while calls are in progress, it is rapidly replaced by replacement ACF G. However, ACF G does not have a copy of the current resource allocation data that was being used by ACF E prior to failing, so when replacement ACF G is called upon to allocate resources it cannot be sure whether the required resources are currently available.

Whenever an existing call is cleared, the replacement ACF G will receive a de-allocation request informing it of any freeing of resources required. In existing protocols the de-allocation request simply refers to the original allocation request without repeating details of the allocation. This means that the replacement ACF G cannot determine how much of the resources to release as calls clear.

Since both ACFs D and E were informed of all calls traversing the inter-island path M, they both have similar resource allocation data. According to the present invention, the replacement ACF G communicates with its peer ACF D at the other island A to retrieve information on the current resource allocations against the inter-island path M.

In existing protocols individual resource allocations (e.g. as used in communications between the CCF and ACF within a island) are only meaningful within that island. Thus it is not possible to simply transfer resource allocation information from one ACF to its peer in another island as that island will be unable to correlate the transferred resource allocation information with calls handled by that island.

As illustrated in FIG. 2, when the replacement ACF G takes over from the failed ACF E, it sends a message to its peer ACF D. This message notifies ACF D that recovery is underway on resource allocations relating to all existing calls between its island and the island (in this case island B) containing the replacement ACF (i.e. G), and requests it to respond with a message to ACF G indicating the current level of unallocated resources on path M. When the unallocated resource level message is received at ACF G it can immediately start accepting new resource allocation requests and de-allocation requests from its local CCF L, and respond to these requests by making new allocations of resources from the pool of indicated unused resources.

On clearing calls for which the original allocation data in ACF E has been lost, a de-allocation request will be sent to the ACF D still operating in island A. This ACF performs its normal resource de-allocation actions, and in addition, if the allocation data indicates that the call is one of those in force at the time of the request message from the replacement ACF G, then it will send a message to ACF G indicating the quantity of resources that are being de-allocated. ACF G increases its recorded level of unused resource accordingly.

Messages from ACF D to ACF G continue to be sent until all resources that were allocated at the time of the failure of ACF E have been released. At this point both working ACFs D and G will have a complete set of corresponding resource allocation records and the recovery process will have completed. This is not to say that all resources must be free at any one time in order to achieve recovery. On the contrary, any resources freed since receipt of the request message from the replacement ACF G may be re-allocated by recovered ACF G at any time.

Although described above in terms of a replacement ACF, some systems will be able to recover a failed ACF and return it to service within an acceptable time such that replacement is not necessary. Alternatively, a replacement ACF may itself be replaced some time later by the recovered ACF. The present invention also applies to recovered ACFs where information of resource allocation may have been lost, or merely become inaccurate due to changes in resource allocation that occurred whilst the ACF was not functioning.

The invention claimed is:

1. A communications system, comprising:
   a) a plurality of islands;
   b) a media path comprising resources for carrying data in a plurality of calls between first and second ones of the islands, each of the first and second islands comprising control means for managing allocation of the resources of the media path between the plurality of calls;
   c) means for detecting a faulty control means, and for replacing the faulty control means with a working replacement control means, or for recovering the faulty control means to working order as a recovered control means; and
   d) means for providing to the replacement or recovered control means, on replacement or recovery, respectively, information on the allocation of the resources of the media path, the replacement or recovered control means including means for requesting transfer of the information from the information providing means.

2. The system as claimed in claim 1, in which the resources allocated to a call are released on termination of the call, in which the information providing means is operative for providing to the replacement or recovered control means information on released resources as the released resources become available on the media path.

3. The system as claimed in claim 2, in which the released resources comprise bandwidth made available by the termination of the calls.

4. The system as claimed in claim 1, in which a source of the information to be provided is located in the other one of the first and second islands from the replacement or recovered control means.

5. The system as claimed in claim 1, and means for coordinating operation of the control means by communication between the islands.

6. The system as claimed in claim 5, in which each island is associated with a call control function (CCF); and in which the communication between the islands by the coordinating means comprises communication between the CCFs associated with said islands.

7. The system as claimed in claim 6, in which one of the CCFs is associated with each end point of each call; and in which the communication between the islands comprises communication between the CCFs associated with the end points of each call.

8. The system as claimed in claim 1, in which the plurality of islands is interconnected via a backbone network in which the replacement or recovered control means is in a different island from a source of the information to be provided.

9. The system as claimed in claim 1, in which the replacement or recovered control means is connected via a router to a source of the information to be provided.

10. The system as claimed in claim 1, in which a source of the information to be provided comprises a further control means.

11. The system as claimed in claim 6, in which the CCFs are implemented according to internet protocol.

12. The system as claimed in claim 1, in which the system is operative for carrying voice traffic as voice over internet protocol.

13. A method of managing communications in a communications system comprising a plurality of islands and a media path comprising resources for carrying data in a plurality of calls between first and second ones of the islands, each of the first and second islands comprising control means for managing allocation of the resources of the media path between the plurality of calls, the method comprising the steps of:
   a) detecting a faulty control means, and replacing the faulty control means with a working replacement control means, or recovering the faulty control means to working order as a recovered control means; and
   b) providing to the replacement or recovered control means, on replacement or recovery, respectively, information on the allocation of the resources of the media path, the information being requested by the replacement or recovered control means.

14. The method of claim 13, including the steps of releasing the resources allocated to a call on termination of the call, and providing information to the replacement or recovered control means on released resources as the released resources become available on the media path.

15. The method of claim 14, in which the released resources comprise bandwidth made available by the termination of the calls.

16. The method of claim 13, and the step of locating a source of the information in the other one of the first and second islands from the replacement or recovered control means.

17. The method of claim 13, including the step of coordinating operation of the control means by communication between the islands.

18. The method of claim 17, in which each island is associated with a call control function (CCF), and in which the communication between the islands comprises communication between the CCFs associated with said islands.

19. The method of claim 18, in which one of the CCFs is associated with each end point of each call, and the step of communicating between the CCFs associated with the end points of each call.

20. The method of claim 13, and the step of interconnecting the plurality of islands by a backbone network in which the replacement or recovered control means is in a different island from a source of the information to be provided.

21. The method of claim 13, and the step of connecting the replacement or recovered control means via a router to a source of the information.

22. The method of claim 13, in which a source of the information comprises a further control means.

23. The method of claim 18, including the step of implementing the CCFs according to internet protocol.

24. The method of claim 13, including the step of carrying voice traffic as voice over internet protocol.

* * * * *